July 21, 1925.                                                  1,547,040
K. HUMPHREY
GOGGLES
Filed March 11, 1924
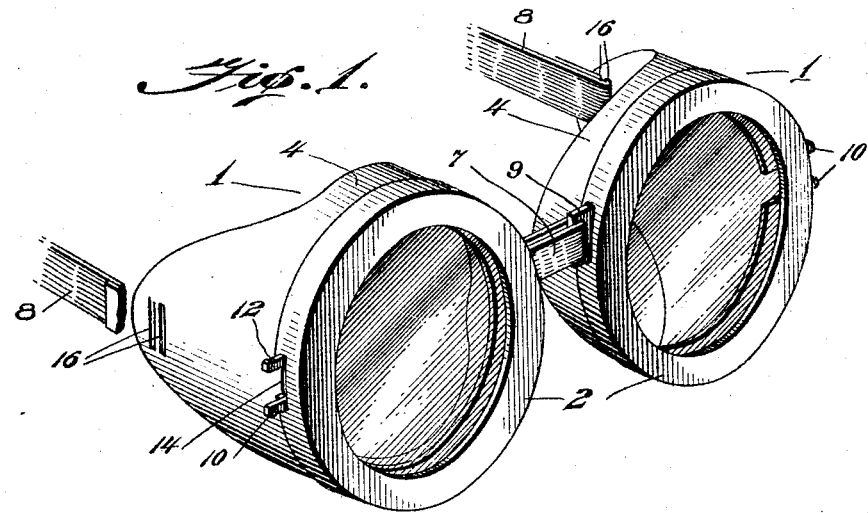
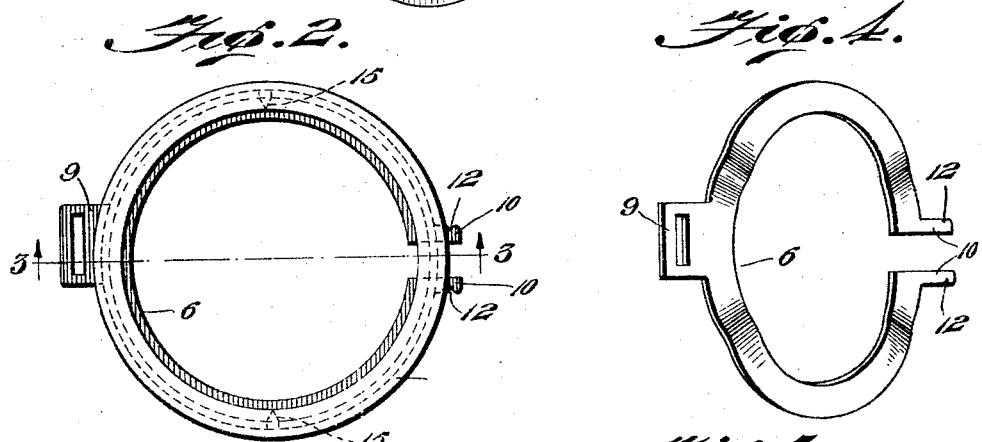
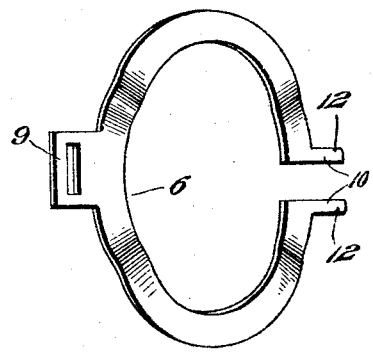
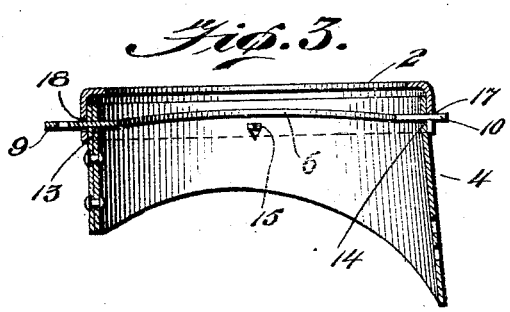
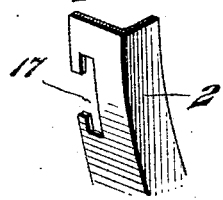
Inventor
Karl Humphrey
By Wm. R. Tillinghast
Attorney Patented July 21, 1925.

1,547,040

UNITED STATES PATENT OFFICE.

KARL HUMPHREY, OF PROVIDENCE, RHODE ISLAND.

GOGGLES.

Application filed March 11, 1924. Serial No. 698,560.

*To all whom it may concern:*

Be it known that I, KARL HUMPHREY, a citizen of the United States, and a resident of the city of Providence, county of Providence, and State of Rhode Island, have invented new and useful Improvements in Goggles, of which the following is a specification.

My invention relates to goggles and the objects of my improvements are to provide a pair of goggles of simple construction within which the lenses or glasses are secured in a readily detachable manner and when in their proper positions are secured in the frames against displacement.

A suggestive embodiment of this invention is illustrated in the accompanying drawings and the novel features of this invention are fully described in connection with the drawings and specifically defined in the claims.

Fig. 1 is a perspective view of a pair of goggles employing a simple form of the present invention.

Fig. 2 is a face view of one member of the goggles.

Fig. 3 is a detailed cross-section taken on the line 3—3 of Figure 2.

Fig. 4 is a side elevation of a certain spring ring employed for securing the lenses in place in the frame.

Fig. 5 is a view of part of the frame showing the locking jaws.

Referring to said drawings,—each of the two members, 1, 1, of a pair of goggles comprises a ring like frame, 2, an eye shield, 4, which is shaped to fit around the eye, and is secured to the frame, 2, by means of the ring, 6. A flexible strap or band, 7, secured to the projections 9, 9, of the rings, 6, 6, connects two members of the goggles, 1, 1, and, together with an elastic band, 8, secured to the shield, acts to properly hold the goggles in place upon the face of the user.

The spring ring, 6,—see Fig. 4—has on one side a projection, 9, with a slot for the engagement of the band, 7, and the ends, 10, 10, at the open part of the ring project outward radially to form grips by means of which the spring ring, 6, may be contracted. Notches, 12, 12, are placed in these projections for the engagement of the finger nails of the operator.

Eye shield, 4, is provided with slots, 13, and, 14, coinciding with similar slots in the flange 2ª of the frame and inward projections, 15, 15, together with slot, 16, 16, for the engagement of the strap, 8. Slot, 13, is engaged by projection, 9, and slot, 14, is engaged by projections, 10, 10. The projections, 15, 15, act as stops for the spring ring, 6, which normally does not rest upon them; the spring ring, 6, being slightly curved as shown in Fig. 3.

The frame, 2, has a slot, 18, which is engaged by projection, 9, of spring ring, 6, said projection 9 serving as an anchoring portion for the ring. The T slot 17 which is engaged by the projections, 10, 10, locks the frame in place upon the eye shield, 4. Thus the spring ring, 6, serves as a ring to strengthen the eye shield, 4, to hold the lenses or glasses securely between itself and the frame, 2, and also as a lock to secure the frame, 2, to the eye shield, 4. The width of the slot, 18, is made slightly greater than the thickness of the spring ring projection, 9, so that when the frame 2, is unlocked at the T slot side of the frame, this side may be elevated, turning upon projection, 9, in the slot, 18, as an axis, sufficiently to permit the lens or glass to be removed or inserted.

More or less variation of the exact details of construction is possible without departing from the principle of this invention. I desire, therefore, not to limit myself to the exact form of the construction shown and designated, but intend in the following claims to point out all of the invention disclosed herein.

I claim:

1. An improvement in goggles comprising an eye shield open at its ends, a lens retaining frame enclosing one end of said shield, and a contractible securing ring located within the shield and having projections extended through complemental portions of both the shield and the frame.

2. An improvement in goggles comprising an eye shield open at its ends, a lens retaining frame enclosing one end of said shield, and a securing ring located within the shield and having separated ends whereby it may be contracted, said ends having angularly disposed portions extended through complemental portions of both the shield and the frame.

3. An improvement in goggles comprising an eye shield open at its ends, a lens retaining frame enclosing one end of said shield, and a securing ring located within the shield and having separated ends provided with angular projections, and an additional projection on said ring positioned opposite to the separated ends, said projections being extended through complemental portions of both the shield and the frame.

4. An improvement in goggles comprising an eye shield open at its ends, a lens retaining frame enclosing one end of said shield, and a contractible securing ring located within the shield and having projections extended through complemental portions of both the shield and the frame, the body of said ring being offset with respect to the vertical plane of said projections.

5. An improvement in goggles comprising an eye shield, a frame having a flange overlapping one end of said shield, said flange and shield having coinciding slots, and a contractible ring having projections extended through said slots, whereby the shield and frame are locked together.

6. An improvement in goggles comprising an eye shield, a frame having a flange overlapping one end of said shield, said flange and shield having sets of coinciding slots, and a contractible ring having projections extended through the respective sets of slots, one of the slots of the flange having an open side to permit ready engagement and disengagement of the ring.

7. An improvement in goggles comprising an eye shield open at its ends, a lens retaining frame enclosing one end of said shield, and a securing ring located within the shield and having separated ends, whereby it may be contracted, said ring having an anchoring portion engaging the ring and the shield and angularly disposed projections.

8. An improvement in goggles comprising an eye shield open at its ends, a lens retaining frame enclosing one end of said shield, a securing ring located within the shield and having an anchoring portion engaging the frame and the shield, said ring having separated ends whereby it may be contracted, said ends having angularly disposed projections removably engaging said frame.

9. An improvement in goggles comprising an eye shield open at its ends, a lens retaining frame enclosing one end of said shield, a securing ring located within the shield and having an anchoring portion engaging the frame and the shield, said ring having separated ends whereby it may be contracted, said frame having an open sided slot and angularly disposed projections on said ring passed through said shield and removably engaging said slot.

10. An improvement in goggles comprising an eye shield open at its ends, a lens retaining frame enclosing one end of said shield, and a securing ring located within the shield and having separated ends, whereby it may be contracted, said ends having an anchoring portion engaging the ring and shield and angularly disposed projections, said anchoring portion having a slot therein.

11. An improvement in goggles comprising a shield, a frame, a contractible ring spaced from said frame and shaped to provide a flexible lens seat and having means for removably locking the shield and frame together, and a lens in the space between the shield and the ring.

12. An improvement in goggles comprising a shield, a frame, a contractible ring spaced from said frame and having portions of its body offset from the normal plane of the body to provide a flexible lens seat, said ring having means for locking the shield and frame together, and a lens in the space between the shield and the ring.

13. An improvement in goggles comprising an eye shield open at its ends, a lens retaining frame enclosing one end of said shield, and a securing ring located within the shield and having separated ends, whereby it may be contracted, said ring having an anchoring portion engaging the ring and shield and angularly disposed projections, said anchoring portion having a slot therein, and stops carried by the shield for limiting inward movement of said ring.

14. An improvement in goggles comprising a pair of shields, frames on the ends of the respective shields, contractible rings each having an anchoring member and lateral operating projections which lock a shield and its frame together, and connecting means engaging the anchoring members of the respective rings.

15. An improvement in goggles comprising a pair of shields, frames on the ends of the respective shields, contractible rings each having an anchoring member and lateral operating projections which lock a shield and its frame together, an elastic band connecting the anchoring members, and an elastic band connected to each shield.

Signed this 22nd day of July, 1924

KARL HUMPHREY.